(12) United States Patent
Parkin et al.

(10) Patent No.: US 9,303,769 B2
(45) Date of Patent: Apr. 5, 2016

(54) CARTRIDGISED MIXER SEAL

(71) Applicant: AES Engineering Ltd., Global Technology Centre, Mill Close (GB)

(72) Inventors: Andrew Parkin, Wickersley (GB); Andrew Wayne Harrison, Kimberworth (GB)

(73) Assignee: AES Engineering Ltd., Rotherham (GB)

( * ) Notice: Subject to any disclaimer, the term of this patent is extended or adjusted under 35 U.S.C. 154(b) by 0 days.

(21) Appl. No.: 14/478,483

(22) Filed: Sep. 5, 2014

(65) Prior Publication Data

US 2015/0069715 A1    Mar. 12, 2015

(30) Foreign Application Priority Data

Sep. 6, 2013 (GB) .................................. 1315945.4

(51) Int. Cl.
  *F16J 15/34* (2006.01)
  *B01F 15/00* (2006.01)

(52) U.S. Cl.
  CPC ....... *F16J 15/3464* (2013.01); *B01F 15/00006* (2013.01)

(58) Field of Classification Search
  CPC .......................... F16J 15/3404; F16J 15/3464
  See application file for complete search history.

(56) References Cited

U.S. PATENT DOCUMENTS

| | | | | |
|---|---|---|---|---|
| 3,334,905 A | * | 8/1967 | Horwitz et al. ................ | 277/365 |
| 4,109,920 A | * | 8/1978 | Wiese ............................ | 277/408 |
| 4,261,582 A | * | 4/1981 | Womack .................. | F16J 15/38 277/390 |
| 8,770,589 B2 | * | 7/2014 | Hashimoto et al. ........... | 277/358 |

* cited by examiner

*Primary Examiner* — Gilbert Lee
(74) *Attorney, Agent, or Firm* — Quine Intellectual Property Law Group, P.C.

(57) ABSTRACT

A mechanical seal comprising;
  a. a sleeve which is for sealing engagement with a rotating shaft;
  b. one or more primary or secondary sealing faces urged toward one another via a plurality of spring members;
  c. a gland which is for detachable attachment to a housing of within which the seal is to be situated:
  d. a clamp ring wherein set screws reside to provide drive between said sleeve, clamp ring and shaft; and
  e. one or more setting members which are detachably attached to said clamping ring to restrict axial movement and make the internal dimensions independent of tolerances and assembly accuracy.

11 Claims, 2 Drawing Sheets

CARTRIDGISED MIXER SEAL

RELATED APPLICATIONS

This application claims benefit and priority to UK application GB 1315945.4, Cartridgized Mixer Seal, filed Sep. 6, 2013, which is incorporated in its entirety herein for all purposes.

FIELD OF INVENTION

The invention relates to mechanical seals which are fitted to high pressure agitator applications which may be used in all types of industries to separate a first liquid from a second liquid. Seals of the invention are to aid correct installation.

BACKGROUND TO INVENTION

Mechanical seals are commonplace in many industries for providing a seal between rotating and stationary components. The seal is created by one sealing face rotating against another stationary sealing face. Commonly, one of these faces is urged toward the other through the use of springs thus providing the required sealing force. The amount of spring force is optimised so that the operational life of the seal is as long as possible whilst the volume of fluid that passes between the faces is kept to a minimum. The more fluid that passes between the faces means that the operational life will be longer whilst this also means that emissions into the atmosphere and loss or contamination of potentially costly product fluid is increased. If virtually no fluid passes between the faces then the operational life will be shorter due to more of the face material being in contact thereby generating more heat and reducing the length of time before the seal faces are degraded to a point where the leaked volume of fluid is no longer controlled. This is known as a seal failure.

The amount of spring force is controlled in seal designs by maintaining a consistent level of compression through maintaining the physical clearances between components during assembly and operation of the seal. This is commonly done through the use of setting clips which set the distance that the rotary components are spaced from the stationary components; however due to space or design constraints this is not always possible.

The majority of reactors and agitators in the world are dependent upon the performance of a canisterised mechanical seal, which in turn is entirely dependent upon the tolerances, particularly the axial tolerances of the equipment inside which it is encased. An example of where this is not easily possible is mixer seals that are used on Lightnin Agitator applications. In these applications the gland encases the seal making it impossible to access the internal workings of the seal and easily access any traditional setting means that ensure correct alignment and installation of the seal on the equipment. The installer is therefore reliant on the tolerances and/or final assembly of the equipment being correct to provide the correct spring forces for the mechanical seal to operate as desired.

STATEMENTS OF INVENTION

The invention relates to a mechanical seal for providing a fluid-tight seal between relatively rotatable elements, the seal comprising;
 a. a sleeve for sealing engagement with said rotating shaft;
 b. one or more primary or secondary sealing faces urged toward one another via one or more spring members;
 c. a gland which is detachably attached to said housing of said equipment at both ends of the seal;
 d. a clamp ring wherein set screws reside to provide drive between said sleeve, clamp ring and shaft;
 e. one or more setting members which are detachably attached to said clamping ring thus restricting axial movement and making the internal dimensions independent of the tolerances and assembly accuracy of the equipment.

Preferably the gland extends the entire length of the seal thereby encasing the seal. More preferably the gland has one or more orifices wherein said setting members protrude from the external surface of said gland to said clamping ring and so detachably attaching the stationary and rotary components.

More preferably the gland has a one or more orifices which are in axial alignment with said set screws which reside in said clamp ring and so allowing the rotary components to be secured to the equipment shaft.

More preferably the setting members are threaded bolts and the orifices that they protrude through are also threaded thereby securely fixing the setting members to the gland.

More preferably the setting members locate into cavities in said clamping ring thereby axially restraining the clamp ring.

More preferably a lug on said shaft locates into a cavity in the clamping ring thereby providing a secondary drive method ensuring that the rotary components continue to rotate with the shaft even should the set screws become detached from the shaft during operation.

DETAILED DESCRIPTION

The invention will now be described, by way of examples only, with reference to the accompanying drawings.

Figure 1:
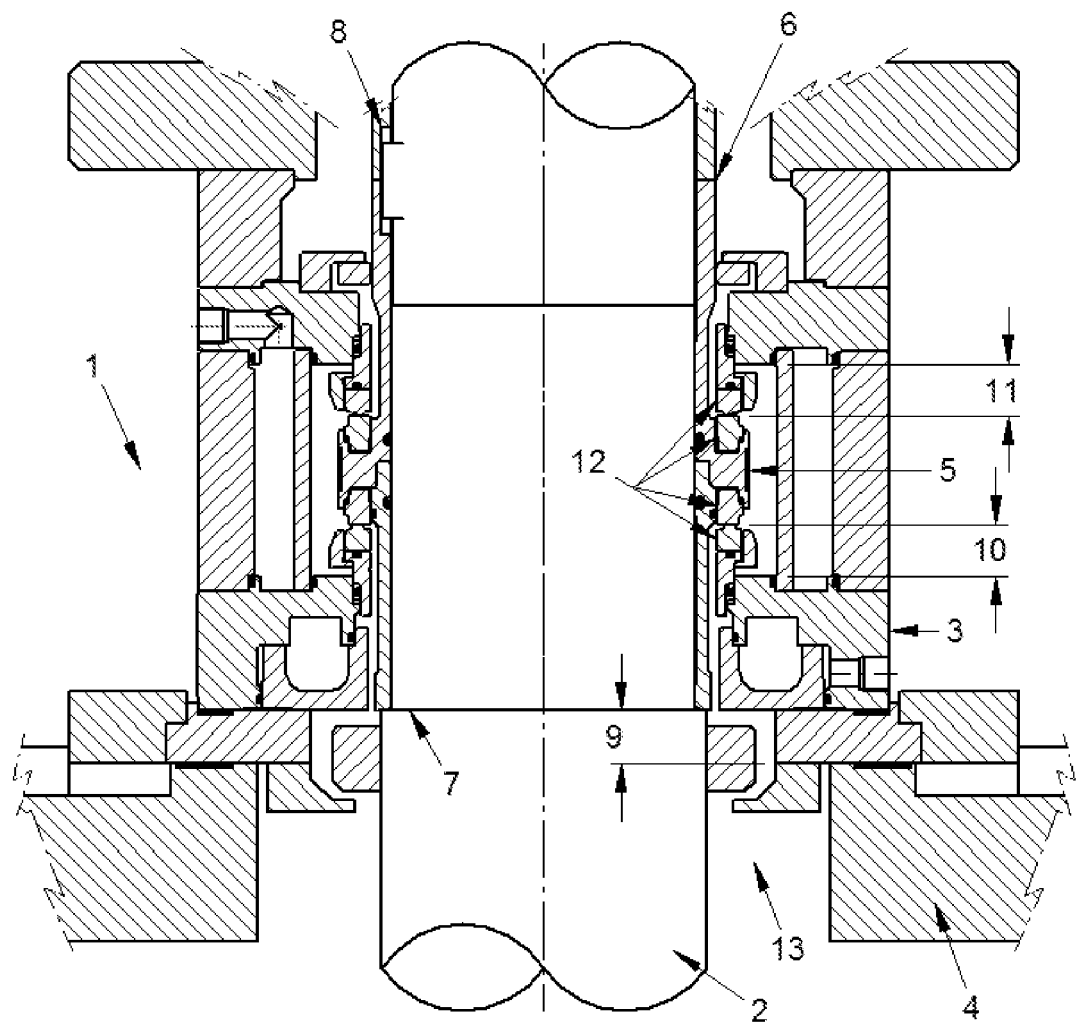
FIG. 1 shows the cross section of a known solution.

As shown in FIG. 1 a known solution for the seal is shown wherein the seal 1 is axially constrained in a vertical orientation on the shaft 2. The stationary components 3 of the seal 1 are held in their axial and concentric position by the housing 4. The rotary components 5 are held concentric to the shaft 2 via a sleeve 6. The sleeve 6 is held in its axial location by a ledge 7 on the in board side of the shaft 2 and a removable section 8 at the outboard end of the shaft 2. The dimensional relationship 9 between the housing 4 and the ledges 7 and 8 on the shaft 2 determine the internal dimensions 10 and 11 between the rotary 5 and stationary components 3. If the dimensional relationship 9 is reduced then the seal's internal dimension 10 will be reduced whilst 11 will be increased. If the dimensional relationship 9 is increased then the seal's internal dimension 10 will be increased whilst 11 will be reduced. As the spring force for the seal faces 12 is created from these internal dimensions 10 and 11 a change in the dimensional relationship 9 will therefore have a direct impact on the amount of leakage and also the service life of the seal 1.

As well as the dimensional relationship 9 affecting the internal dimensions 10 and 11 if the location of the removable section 8 is incorrect it will allow the sleeve 6 to move axially along the shaft 2 due to pressure in the chamber 13 thereby affecting the internal dimensions 10 and 11 and so affecting the amount of leakage and service life of the seal 1.

Figure 2:
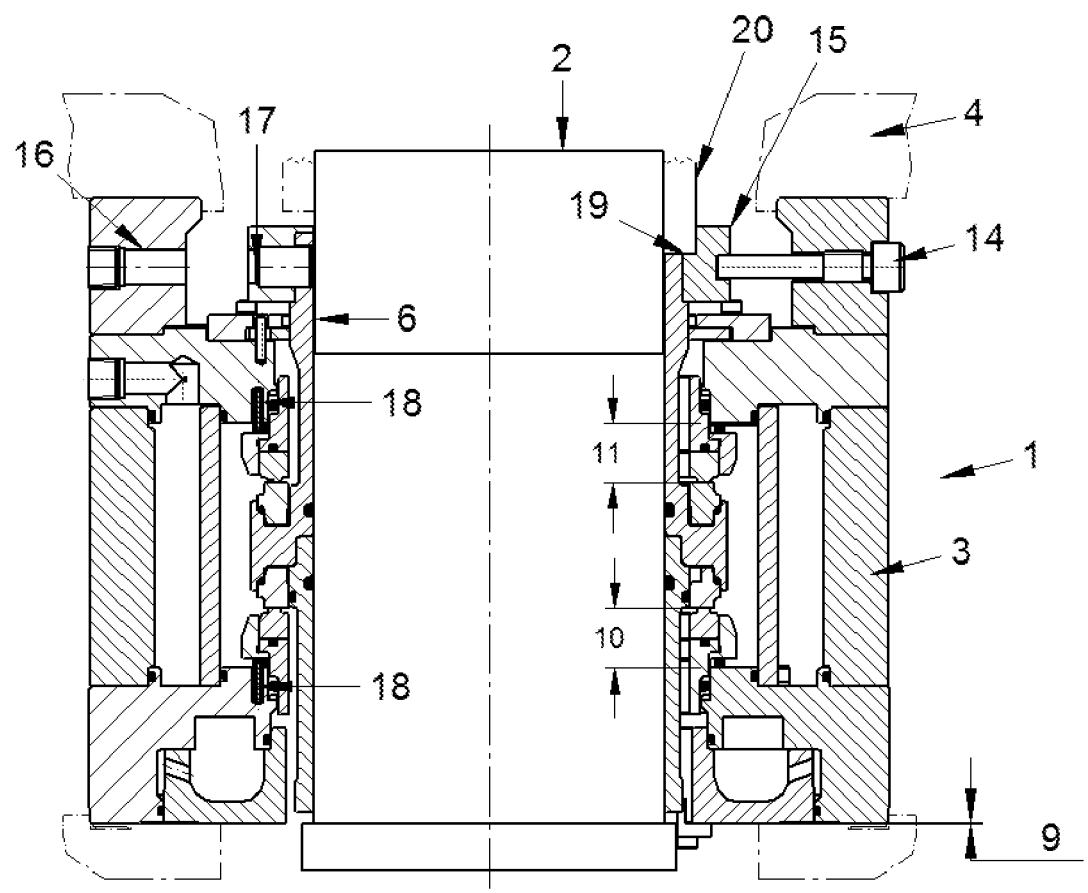
FIG. 2 shows a cross section of the preferred embodiment of the invention

The preferred embodiment of the invention as shown in FIG. 2 has the stationary components 3 secured between the housing 4 in the same way as the current solution in FIG. 1. The internal dimensions 10 and 11 are maintained during installation of the seal 1 via setting means which in the preferred embodiment are bolts 14 which extends from the exterior of the seal 1 to a clamping ring 15 which is fitted to the sleeve 6. Access holes 16 allow the set screws 17 which are located in the clamping ring 15 to be tightened to the shaft 2 prior to the setting bolts 14 being removed. This installation method means that irrespective of the dimensional relationships 9 of the shaft 2 and the housing 4 the internal dimensions 10 and 11 are always at the desired dimensions and so meaning that the springs 18 are compressed to the correct dimension aiding correct operation of the seal. Located in the clamp ring 15 is also a slot 19 wherein the drive lug 20 in the shaft locates thereby allowing a secondary drive means for the rotary components. This ensures that not only does the seal use all the affordable space without requiring modification of the equipment but also ensures that should drive through the set screws 17 be lost the rotary components 5 will still rotate with the shaft 2.

The invention claimed is:

1. A mechanical seal comprising;
   a) a sleeve which is for sealing engagement with a rotating shaft;
   b) one or more primary or secondary sealing faces urged toward one another via a plurality of spring members;
   c) a gland which is for detachable attachment to a housing of within which the seal is to be situated;
   d) a clamp ring wherein one or more set screws reside to provide drive between said sleeve, clamp ring and shaft; and
   e) one or more setting members which are detachably attached to said clamping ring to restrict axial movement and make the internal dimensions independent of tolerances and assembly accuracy; and,
   wherein the gland extends along the entire length of the seal thereby encasing the seal.

2. A mechanical seal according to claim 1, wherein a lug on said shaft locates into a cavity in said clamp ring.

3. The mechanical seal of claim 1, wherein one or more of the set screws are in direct contact with each of the sleeve, clamp ring, and shaft.

4. The mechanical seal of claim 1, wherein the set screw and setting member are both aligned perpendicular to a central axis of the shaft.

5. The mechanical seal of claim 1, wherein the one or more set screws are other than a setting member.

6. The mechanical seal of claim 1, wherein the gland and clamp ring are concentric.

7. The mechanical seal of claim 1, wherein the one or more setting members are configured to make the internal dimensions independent by aligning a center of the clamping ring with the shaft.

8. A mechanical seal comprising:
   a) a sleeve which is for sealing engagement with a rotating shaft;
   b) one or more primary or secondary sealing faces urged toward one another via a plurality of spring members;
   c) a gland which is for detachable attachment to a housing of within which the seal is to be situated;
   d) a clamp ring wherein one or more set screws reside to provide drive between said sleeve, clamp ring and shaft; and
   e) one or more setting members which are detachably attached to said clamping ring to restrict axial movement and make the internal dimensions independent of tolerances and assembly accuracy; and,
   wherein said gland has one or more orifices from which said setting members protrude from the external surface of said gland and extend to said clamping ring.

9. A mechanical seal according to claim 8, wherein said setting members are threaded bolts and the orifices that they protrude through are also threaded.

10. A mechanical seal according to claim 9, wherein said setting members locate into cavities in said clamping ring.

11. A mechanical seal comprising:
   a) a sleeve which is for sealing engagement with a rotating shaft;
   b) one or more primary or secondary sealing faces urged toward one another via a plurality of spring members;
   c) a gland which is for detachable attachment to a housing of within which the seal is to be situated;
   d) a clamp ring wherein one or more set screws reside to provide drive between said sleeve, clamp ring and shaft; and
   e) one or more setting members which are detachably attached to said clamping ring to restrict axial movement and make the internal dimensions independent of tolerances and assembly accuracy; and,
   wherein said gland has one or more orifices which are co-axial with said set screws which reside in said clamp ring.

* * * * *